United States Patent
Cho

(10) Patent No.: US 7,299,323 B2
(45) Date of Patent: Nov. 20, 2007

(54) MEMORY CONTROLLER HAVING A READ-MODIFY-WRITE FUNCTION

(75) Inventor: Sang-Yeun Cho, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 341 days.

(21) Appl. No.: 11/072,870

(22) Filed: Mar. 4, 2005

(65) Prior Publication Data

US 2005/0198458 A1    Sep. 8, 2005

(30) Foreign Application Priority Data

Mar. 8, 2004    (KR)    ...................... 10-2004-0015591

(51) Int. Cl.
*G06F 12/06*    (2006.01)
(52) U.S. Cl. ................................... 711/155
(58) Field of Classification Search ................. 711/155
See application file for complete search history.

(56) References Cited

U.S. PATENT DOCUMENTS 5,737,744 A * 4/1998 Callison et al. ............ 711/114
6,718,444 B1 * 4/2004 Hughes ...................... 711/155
6,868,486 B1 * 3/2005 Ward ......................... 711/158

FOREIGN PATENT DOCUMENTS

| JP | 5298179 | 12/1993 |
|---|---|---|
| JP | 7129468 | 5/1995 |
| JP | 2000-003302 | 7/2000 |

* cited by examiner

*Primary Examiner*—Kevin L. Ellis
(74) *Attorney, Agent, or Firm*—F. Chau & Associates, LLC

(57) ABSTRACT

Provided are a memory controller with data read-modify-write function, and a system-on-chip (SOC) having such a memory controller, where the memory controller is connected to a memory, the memory controller is connected to IP (intellectual property) blocks and a microprocessor via a system bus, and, in response to one of read, write, and modify request signals received from the one of the IP blocks or the microprocessor and an address signal, the memory controller reads a data signal from the memory, writes a write data signal to the memory, or modifies the data signal read from the memory and writes the modified data signal to the memory such that the memory controller and the SOC can reduce occupation time for the system bus and access time for the memory and additionally reduce unnecessary power consumption.

18 Claims, 4 Drawing Sheets

MEMORY CONTROLLER HAVING A READ-MODIFY-WRITE FUNCTION

CROSS-REFERENCE TO RELATED APPLICATION

This application claims foreign priority under 35 U.S.C. § 119 to Korean Patent Application No. 2004-15591, filed on Mar. 8, 2004, in the Korean Intellectual Property Office, the disclosure of which is incorporated herein in its entirety by reference.

BACKGROUND OF THE INVENTION

1. Field of the Invention

The present disclosure relates to memory controllers, and more particularly, to memory controllers for system-on-chip (SOC) operation.

2. Description of Related Art

In general, a system-on-chip (SOC) may include a memory controller for accessing an external memory. For example, the external memories accessed by the SOC may include non-volatile memories such as ROMs and Flash memories, used primarily to store programs, and volatile memories such as SRAMs and SDRAMs, used for various applications. An example of a conventional SOC is disclosed in U.S. Pat. No. 6,526,462.

FIG. 1 is a block diagram showing a SOC 10 comprising a conventional memory controller 12 and an external memory 20. The SOC 10 comprises the memory controller 12, intellectual property (IP) blocks 13 and 14, a microprocessor 15, an internal memory 16, and a direct memory access unit (DMA) 17. The SOC 10 may further comprise additional IP blocks and others, which are omitted for the sake of simplification. The memory controller 12, the IP blocks 13 and 14, the microprocessor 15, the internal memory 16, and the DMA 17, which are connected to a system bus 11, are in communication with each other. In addition, in some cases, data stored in the external memory 20 needs to be error-corrected. An error correcting code (ECC) processor (not shown) of an optical disk system as known in the art is an example of an apparatus for error-correcting the data stored in the external memory and rewriting data. The ECC processor reads error correcting data out of the data stored in the external memory and performs an XOR operation on the read data and calculated error mask data, and rewrites the result of the XOR operation to the external memory. Similarly to the ECC processor, one of the IP blocks 13 and 14 in the SOC 10 reads data stored in the external memory 20, modifies the read data, and rewrites the modified data to the external memory 20.

As shown in FIG. 1, the aforementioned operations are performed by the IP block 13. The IP block 13 requests the memory controller 12 to read data of the external memory 20 via the system bus 11. Next, the IP block 13 receives data read from the external memory 20 via the system bus 11 from the memory controller 12, as shown in line A. The IP block 13 modifies the read data and transmits the modified data to the memory controller 12 via the system bus 11, as shown in line B. The memory controller 12 writes the modified data received from the IP block 13 via the system bus 11 to the external memory 20.

Here, in order to use the system bus 11, the IP block 13 must acquire a privilege for the system bus 11 from an arbiter (not shown). In addition, in order to read the data stored in the external memory 20, the IP block 13 must acquire the privilege for the system bus 11 from the arbiter, and transmit a read address signal to the memory controller 12, and transmit a control data signal to the memory controller 12. In addition, in order to write the modified data to the external memory 20, the IP block 13 must acquire the privilege for the system bus 11 from the arbiter, transmit a write address signal to the memory controller 12, and transmit the modified data signal to the memory controller 12.

As described above, during an operation of modifying the data signal stored in the external memory 20, the IP block 13 occupies the system bus 11 twice. Therefore, there is a problem in that the occupation time of the IP block 13 occupying the system bus 11 is long. As a result, until the data transmission between the IP block 13 and the memory controller 12 is completed, other devices in the SOC 10 cannot use the system bus 11, so that overall performance of the SOC 10 may decrease. In addition, during the operation of modifying the data signal stored in the external memory 20, the address signal transmission and the data signal transmission between the IP block 13 and the memory controller 12 are performed twice, such that efficiency may be reduced.

SUMMARY OF THE INVENTION

The present disclosure provides an exemplary memory controller capable of reducing occupation time for a system bus by reading, modifying, and writing data stored in a memory.

The present disclosure also provides an exemplary SOC (system-on-chip) comprising a memory controller capable of reducing occupation time for a system bus by reading, modifying, and writing data stored in a memory.

According to an aspect of the present disclosure, there is provided a memory controller, wherein the memory controller is connected to a memory, wherein the memory controller is connected to intellectual property (IP) blocks and a microprocessor via a system bus, and wherein, in response to one of read, write, and modify request signals received from the one of the IP blocks or the microprocessor and an address signal, the memory controller reads a data signal from the memory, writes a write data signal to the memory, or modifies the data signal read from the memory and writes the modified data signal to the memory.

According to another aspect of the present disclosure, there is provided a SOC (system-on-chip) comprising a microprocessor connected to a system bus, the microprocessor controlling all devices connected to the system bus and executing a predetermined program; an internal memory storing the predetermined program or main data obtained in operations of the microprocessor; IP blocks connected to the system bus, each of the IP blocks performing a predetermined function; and a memory controller connected to an external memory and the system bus, wherein, in response to one of read, write, and modify request signals received from the one of the IP blocks or the microprocessor and an address signal, the memory controller reads a data signal from the external memory, writes a write data signal to the external memory, or modifies the data signal read from the external memory and writes the modified data signal to the external memory.

BRIEF DESCRIPTION OF THE DRAWINGS

The above and other features of the present disclosure will become more apparent by describing in detail exemplary embodiments thereof with reference to the attached drawings, in which.

DETAILED DESCRIPTION OF PREFERRED EMBODIMENTS

Figure 1:
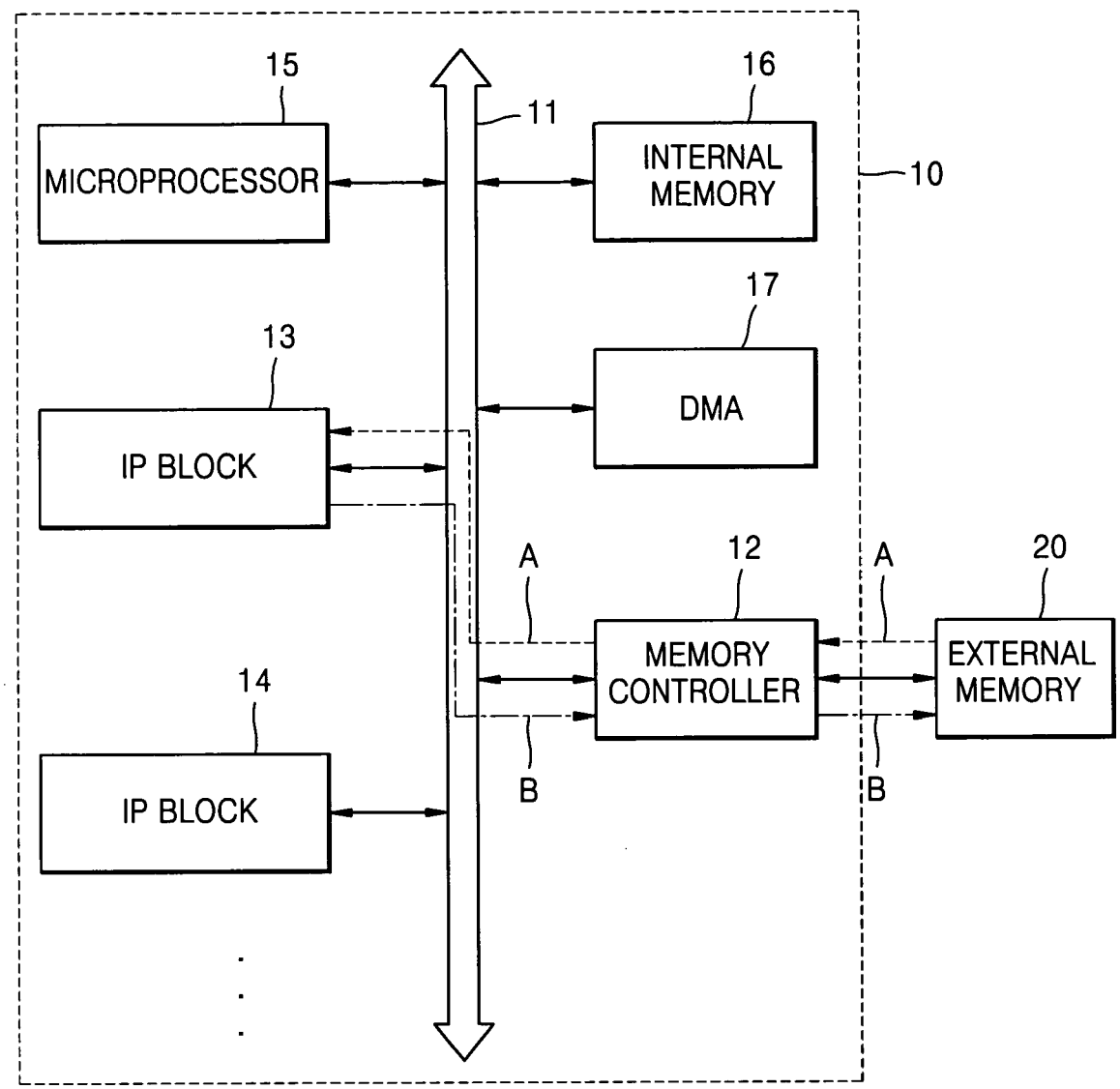
FIG. 1 is a schematic block diagram showing a system-on-chip (SOC) comprising a conventional memory controller and an external memory.

The present disclosure and operational advantages thereof may be more fully understood by referring to the accompanying drawings and explanations thereof. Exemplary embodiments of the present disclosure will be described with reference to the accompanying drawings to explain the present disclosure in detail. In the drawings, like reference numerals may be used to indicate like elements.

Figure 2:
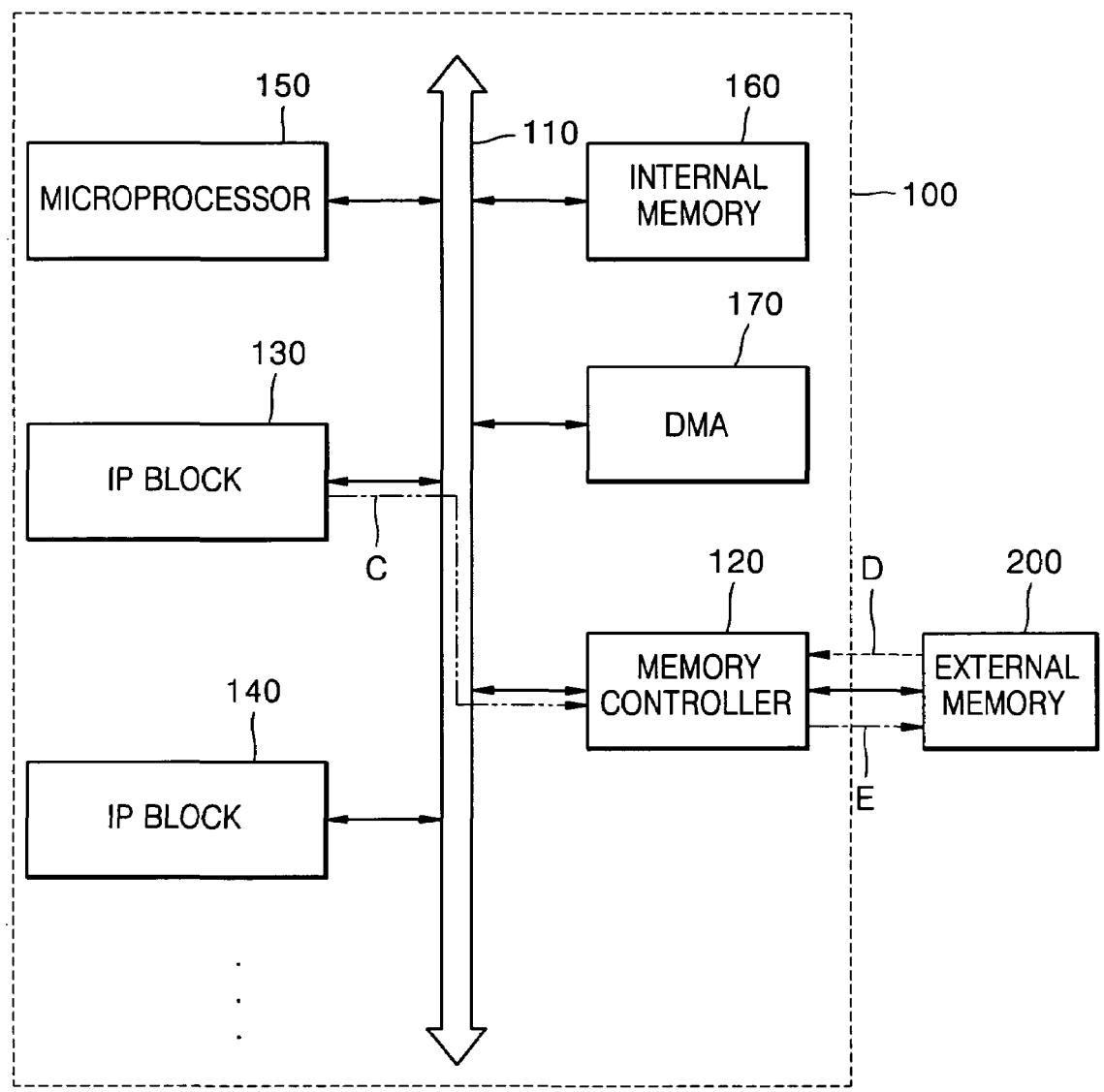
FIG. 2 is a schematic block diagram showing a SOC comprising a memory controller according to the present disclosure and an external memory.

FIG. 2 is a block diagram showing a system-on-chip (SOC) 100 comprising a memory controller 120 according to the present disclosure, and an external memory 200. The SOC 100 comprises the memory controller 120, intellectual property (IP) blocks 130 and 140, a microprocessor 150, an internal memory 160, and a direct memory access (DMA) unit 170. The memory controller 120, the IP blocks 130 and 140, the microprocessor 150, the internal memory 160, and the DMA 170, which are each connected to a system bus 110, are in communication with each other via the system bus 110. Detailed descriptions of devices in the SOC 100 that are not related to the present disclosure are omitted for brevity. The IP blocks 130 and 140 or the microprocessor 150 request the memory controller 120 to perform operations of reading, writing, or modifying data in the external memory 200. The memory controller 120 performs a control operation on the external memory 200 requested by one of the IP blocks 130 and 140 or the microprocessor 150. Detailed description of operations for reading and writing data in the external memory 200 is omitted because these operations are well known by those of ordinary skill in the related art. In this exemplary embodiment of the present disclosure, the operation of modifying the data stored in the external memory 200 under the control of the IP block 130 will be described in detail.

As shown in line C of FIG. 2, the IP block 130 requests via the system bus 110 that the memory controller 120 modify data. As shown in line D, in response to the data modification request of the IP block 130, the memory controller 120 reads a data signal stored in the external memory 200 and modifies the read data signal. As shown in line E, the memory controller 120 rewrites the modified data signal to the external memory 200. As described above, even if the IP block 130 requests the memory controller 120 to modify data, the memory controller 120 automatically performs the operations of reading, modifying, and writing the data stored in the external memory 200. Therefore, during the operation of modifying the data stored in the external memory 200, the IP block 130 occupies the system bus 110 just one time, such that the occupation time of the IP block 130 occupying the system bus 110 can be reduced.

Figure 3:
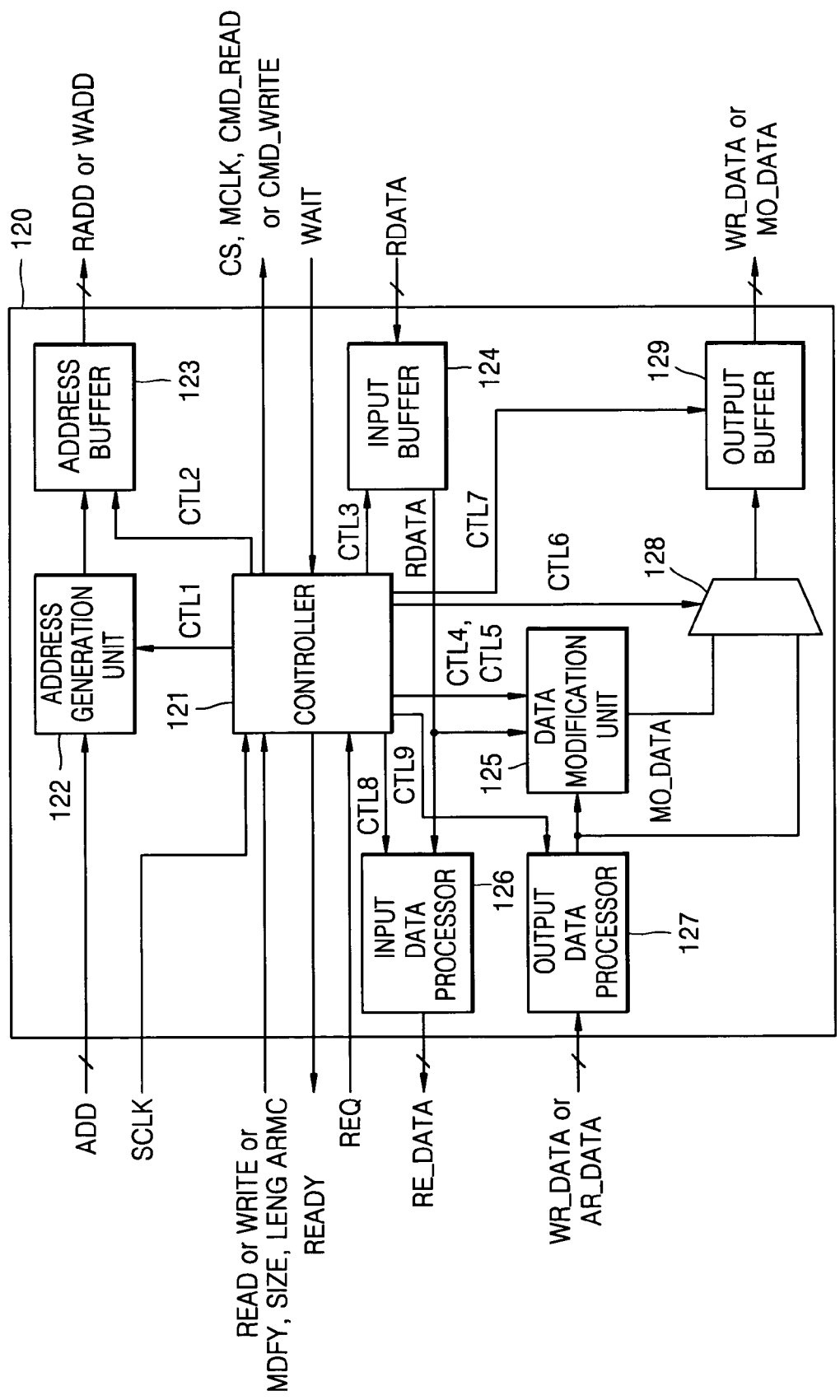
FIG. 3 is a schematic diagram showing the memory controller of FIG. 2.

FIG. 3 is a detailed view showing the exemplary memory controller 120 of FIG. 2. The memory controller 120 comprises a controller 121, an address generation unit 122, an address buffer 123, an input buffer 124, a data modification unit 125, an input data processor 126, an output data processor 127, a selection unit 128, and an output buffer 129. In response to a transmission request signal REQ received from the IP block 130 of FIG. 2 via the system bus 110, the controller 121 initiates communication with the IP block 130. The controller 121 receives any one of read, write, and modify request signals READ, WRITE, and MDFY, respectively, from the IP block 130. When the controller receives the read request signal READ or the write request signal WRITE, the controller 121 further receives size information SIZE or length information LENG of the to-be-transmitted data signal from the IP block 130. The size information SIZE means the number of bits of a data signal transmitted at one time between the memory controller 120 and the IP block 130. For example, the size information SIZE is represented with 8-bit, 16-bit, 32-bit, and so on. In a case where the size information SIZE is 8-bit, the data signal is transmitted in units of 8 bits between the memory controller 120 and the IP block 130. The length information LENG means a length of burst transmitted at one time when the data signal is transmitted in a burst manner between the memory controller 120 and the IP block 130.

When it receives the modify request signal MDFY, the controller 121 further receives an arithmetic information signal ARMC from the IP block 130. The arithmetic information signal ARMC denotes types of arithmetic operations of modifying a data signal read form the external memory 200.

In response to one of the read, modify, and write request signals READ, MDFY, and WRITE, the controller 121 outputs control signals CTL1 to CTL9. In addition, the controller 121 outputs a chip selection signal CS, a read command signal CMD_READ, or a write command signal CMD_WRITE to the external memory 200. In addition, the controller 121 outputs a memory clock signal MCLK to the external memory 200 based on a system clock signal SCLK received from a clock generation unit (not shown).

In response to a transmission control signal WAIT received from the external memory 200, the controller 121 transmits a transmission ready signal READY to the IP block 130 via the system bus 110. In response to the transmission ready signal READY, the IP block 130 determines whether or not a read data signal RE_DATA received from the memory controller 120 via system bus 110 is in a valid state.

On the other hand, the IP block 130 may transmit the read request signal READ together with the modify request signal MDFY to the controller 121. This is because the IP block 130 may use the read data signal RDATA that the memory controller 120 reads from the external memory 200 to modify, if necessary. Therefore, in response to the read request signal READ received together with the modify request signal MDFY, the controller 121 generates the control signal CTL8. As a result, in response to the control signal CTL8, the input data processor 126 transmits the read data signal RE_DATA to the IP block 130.

The address generation unit 122 receives an address signal ADD from IP block 130 via the system bus 110. In response to the control signal CTL1, the address generation unit 122 generates a read address signal RADD or a write address signal WADD based on the received address signal ADD and outputs the read address signal RADD or the write address signal WADD to the address buffer 123. The address buffer 123 stores the read address signal RADD or the write address signal WADD received from the address generation unit 122, and, in response to the control signal CTL2, outputs the read address signal RADD or the write address signal WADD to the external memory 200. The input buffer 124 stores the read data signal RDATA received from the external memory 200, and, in response to the control signal CTL3, outputs the stored read data signal RDATA to the data modification unit 125 and the input data processor 126.

The data modification unit 125 is enabled or disabled in response to the control signal CTL4. In addition, the data modification unit 125 selects a type of an arithmetic operation in response to the control signal CTL 5. When it is enabled, the data modification unit 125 performs the arithmetic operation on the read data signal RDATA and the arithmetic data signal AR_DATA and outputs the result of the arithmetic operation as a modification data signal MO_DATA. The data modification unit 125 will be described later in detail.

In response to the control signal CTL8, the input data processor 126 stores the read data signal RDATA received from the input buffer 124. The input data processor 126 constructs the stored read data signal RDATA in a predetermined format, and outputs the resultant signal as read data RE_DATA via the system bus 110. Here, the predetermined format is, for example, a specific transmission order of the read data signal RDATA and a size thereof.

In response to the control signal CTL9, the output data processor 127 receives one of the write data signal WR_DATA and the arithmetic data signal AR_DATA from the IP block 130 via system bus 110 and stores the received data signal. The output data processor 127 constructs the stored write data signal WR_DATA or arithmetic data signal AR_DATA in a predetermined format and outputs the resultant data signal to the data modification unit 125 and the selection unit 128. Here, when the controller 121 receives the write request signal WRITE via the system bus 110, the output data processor 127 receives the write data signal WR_DATA via the system bus 110. On the other hand, when the controller 121 receives the modify request signal MDFY via system bus 110, the output data processor 127 receives the arithmetic data signal AR_DATA. In response to the control signal CTL6, the selection unit 128 selects one of the modification data signal MO_DATA and the output signal of the output data processor 127 and outputs the selected signal. In response to the control signal CTL7, the output buffer 129 stores the modification data signal MO_DATA or the write data signal WR_DATA output from the selection unit 128 and outputs the stored modification data signal MO_DATA or write data signal WR_DATA to the external memory 200. The selection unit 128 is preferably implemented with a multiplexer.

Figure 4:
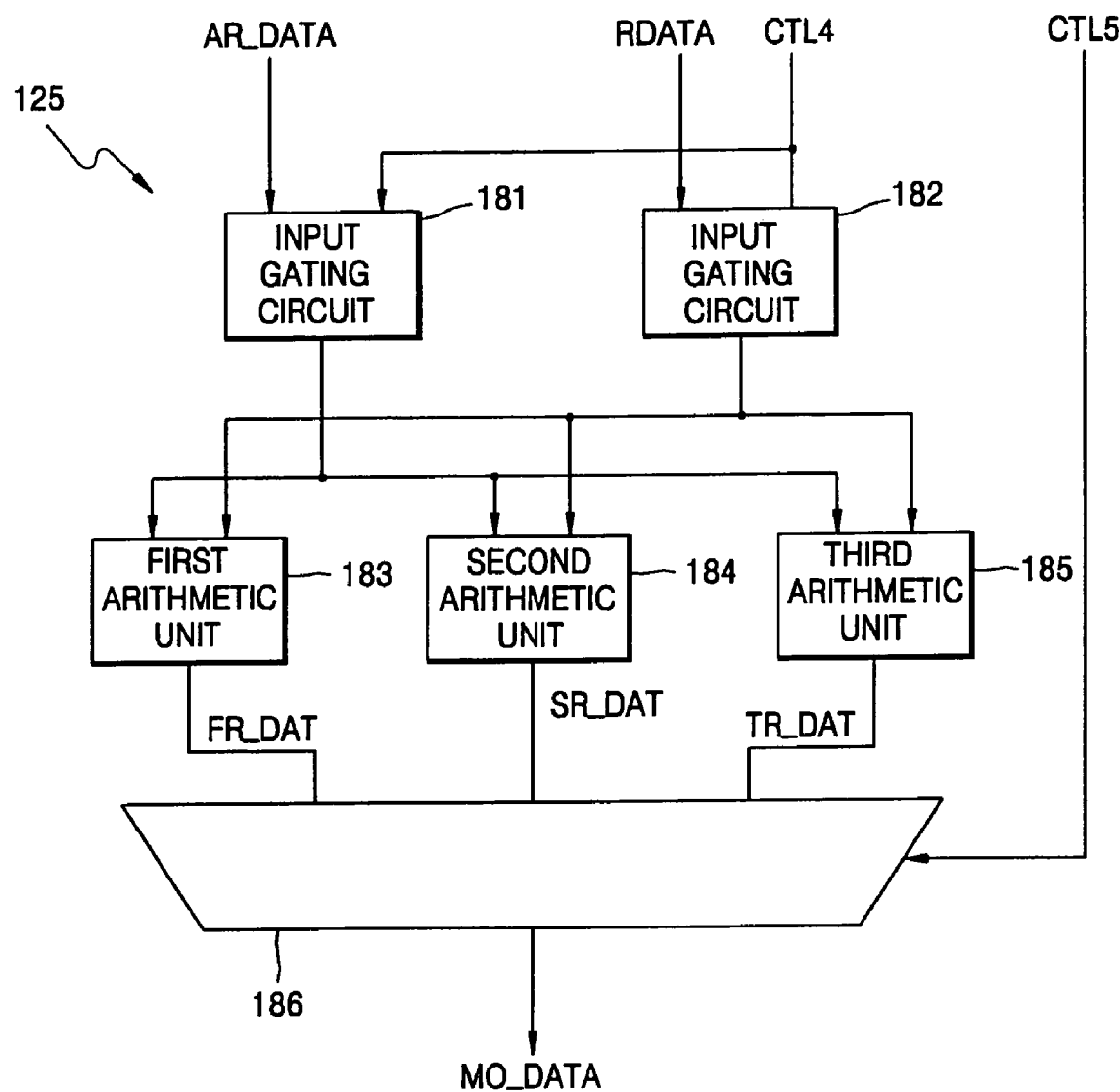
FIG. 4 is a schematic diagram showing a data modification unit of FIG. 3.

FIG. 4 is a detailed view showing the data modification unit 125 of FIG. 3. The data modification unit 125 comprises input gating circuits 181 and 182, first to third arithmetic units 183 to 185, and a multiplexer 186. Although the data modification unit 125 comprises three arithmetic units 183 to 185 in FIG. 4, the data modification unit 125 may further comprise additional arithmetic units, for example. In response to the control signal CTL4, the input gating circuits 181 and 182 outputs or holds the input signals. More specifically, in response to the control signal CTL 4, the input gating circuit 181 outputs or holds the input arithmetic data signal AR_DATA. In addition, in response to the control signal CTL4, the input gating circuit 182 outputs or holds the input read data signal RDATA. The input gating circuits 181 and 182 may be implemented with, for example, AND gates. The first to third arithmetic units 183 to 185 performs arithmetic operations on the arithmetic data signal AR_DATA received from the input gating circuits 181 and 182 and the read data signal RDATA, and outputs the resultant signals FR_DAT, SR_DAT, and TR_DAT of the arithmetic operations. Here, the first to third arithmetic units 183 to 185 perform different arithmetic operations. For example, the first to third arithmetic units 183 to 185 perform an XOR operation, an addition operation, and a multiplication, respectively. In response to the control CTL5, the multiplexer 186 selects one of the resultant signals FR_DAT, SR_DAT, and TR_DAT of the arithmetic operations and outputs the selected signal as the modification data signal MO_DATA.

On the other hand, although the data modification unit 125 performs various arithmetic operations in FIG. 4, the data modification unit 125 might perform only one arithmetic operation, for example. In this case, the data modification unit 125 can be implemented with two input gating circuits and one arithmetic unit.

Next, operations of the aforementioned memory controller 120 for reading, modifying, and writing the data signal stored in the external memory 200 in response to the modify request signal MDFY will be described.

Firstly, the IP block 130 transmits the modify request signal MDFY, the arithmetic information signal ARMC, the address signal ADD, and arithmetic data signal AR_DATA to the memory controller 120 via system bus 110. In response to the modify request signal MDFY, the controller 121 of the memory controller 120 outputs the control signals CTL1, CTL2, and CTL9. The controller 121 outputs the chip selection signal CS, the memory clock signal MCLK, and the read command signal CMD_READ to external memory 200. In response to the control signal CTL 1, the address generation unit 122 stores the address signal ADD received via system bus 110, generates the read address signal RADD based on the stored address signal ADD, and outputs the read address signal RADD to the external memory 200. In response to the control signal CTL2, the address buffer 123 stores the read address signal RADD, and outputs the stored read address signal RADD to the external memory 200. In response to the control signal CTL9, the output data processor 127 receives and stores the arithmetic data signal AR_DATA, constructs the stored arithmetic data signal AR_DATA in a predetermined format, and outputs the resultant signal. Next, the controller 121 outputs the control signals CTL3 to CTL6. In response to the control signal CTL3, the input buffer 124 stores read data signal RDATA received from the external memory 200, and outputs the stored read data signal RDATA. On the other hand, when the controller 121 receives the read request signal READ together with the modify request signal MDFY from the IP block 130, the controller 121 further generates the control signal CTL8 in response to the read request signal READ. As a result, in response to the control signal CTL8, the input data processor 126 stores the read data signal RDATA received from the input buffer 124. The input data processor 126 constructs the stored read data signal RDATA in a predetermined format, and outputs the resultant signal as the read data RE_DATA to the IP block 130 via system bus 110.

When the data modification unit 125 is enabled in response to the control signal CTL4, the data modification unit 125 receives the read data signal RDATA from the input buffer 124 and the arithmetic data signal AR_DATA from the output data processor 127. In response to the control signal CTL5, the data modification unit 125 performs arithmetic operations on the read data signal RDATA and arithmetic data signal AR_DATA, and outputs the results of the arithmetic operations as the modification data signal MO_DATA. In response to the control signal CTL 6, the selection unit 128 selects and outputs the modification data signal MO_DATA.

Next, the controller 121 outputs the control signals CTL1, CTL2, and CTL7. In addition, the controller 121 outputs the write command signal CMD_WRITE to the external memory 200. In response to the control signal CTL 1, the address generation unit 122 generates the write address signal WADD based on the stored address signal ADD and outputs the write address signal WADD to the external memory 200. Here, the read address signal RADD and the write address signal WADD may be identical or different to each other.

On the other hand, in a case where the read address signal RADD and the write address signal WADD are identical and the external memory 200 is a dynamic memory such as an SDRAM, the data modification operation of the memory controller 120 modifying the data in the external memory 200 can be more simplified. That is, in order that the memory controller 120 reads a data signal, after one bank is enabled before the bank is disabled, the modified data signal can be written. As a result, it is possible to reduce the access time of the memory controller 120 accessing the external memory 200. It is possible to reduce unnecessary power consumption.

In response to the control signal CTL2, the address buffer 123 stores the write address signal WADD, and outputs the stored write address signal WADD to the external memory 200. In response to the control signal CTL7, the output buffer 129 stores the modification data signal MO_DATA received from the selection unit 128 and outputs the stored modification data signal MO_DATA to the external memory 200. As a result, the modification data signal MO_DATA is written to storage cells of the external memory 200 corresponding to the write address signal WADD.

In a memory controller and an SOC having the memory controller according to the present disclosure, since the memory controller reads, modifies, and writes data stored in a memory, it is possible to reduce occupation time for a system bus.

In addition, in a memory controller and an SOC having the memory controller according to the present disclosure, in a case where a read address and a write address are identical in a dynamic memory such as an SDRAM, in a state that an associated bank is enabled, the data signal is read, modified and written, so that it is possible to reduce access time for the memory. In addition, it is possible to reduce unnecessary power consumption.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A memory controller,
wherein the memory controller is connected to a memory,
wherein the memory controller is connected to intellectual property (IP) blocks and a microprocessor via a system bus, and
wherein, in response to one of read, write, and modify request signals received from the one of the IP blocks or the microprocessor and an address signal, the memory controller reads a data signal from the memory, writes a write data signal to the memory, or modifies the data signal read from the memory and writes the modified data signal to the memory,
wherein the memory controller comprises:
a controller, in response to the read, write, and modify request signals, outputting first to ninth control signals, and outputting a read command signal or a write command signal together with a chip selection signal and a memory clock signal;
an address generation unit, in response to the first control signal, storing the address signal received via the system bus, and generating a read address signal or a write address signal based on the stored address signal;
an address buffer, in response to the second control signal, storing the read address signal or the write address signal, and outputting the stored read address signal or write address signal to the memory;
an input buffer, in response to the third control signal, storing a read data signal received from the memory, and outputting the stored read data signal; and
a data modification unit being enabled or disabled in response to the fourth control signal,
wherein, when the data modification unit is enabled, in response to the fifth control signal, the data modification unit performs an arithmetic operation on the read data signal and an arithmetic data signal, and outputs the result of the arithmetic operation as a modify data signal.

2. The memory controller according to claim 1,
wherein, when the memory controller receives the write request signal, the memory controller further receives the write data signal via the system bus, and
wherein, when the memory controller receives the modify request signal, the memory controller further receives an arithmetic data signal via the system bus.

3. The memory controller according to claim 1, wherein the memory controller comprises:
a selection unit, in response to the sixth control signal, selecting and outputting one of the modify data signal and the write data signal;
an output buffer, in response to the seventh control signal, storing the modify data signal or the write data signal, and outputting the stored modify data signal or write data signal to the memory;
an input data processor, in response to the eighth control signal, storing the read data signal received from the input buffer, constructing the stored read data signal in a predetermined first format, and outputting the resultant data signal via the system bus; and
an output data processor, in response to the ninth control signal, storing the write data signal or the arithmetic data signal, constructing the stored write data signal or arithmetic data signal in a predetermined second format, and outputting the resultant data signal to the data modification unit and the selection unit.

4. The memory controller according to claim 1, wherein, when the controller receives the modify request signal, the controller further receives an arithmetic information signal, and generates the fifth control signal in response to the arithmetic information signal.

5. The memory controller according to claim 1, wherein, when the controller receives the modify request signal, the controller outputs the read command signal to the memory, and, after a predetermined time interval, outputting the write command signal to the memory.

6. The memory controller according to claim 1, wherein the data modification unit comprises:
input gating circuits, in response to the fourth control signal, outputting or holding the arithmetic data signal and the read data signal; and
an arithmetic unit performs arithmetic operations on the arithmetic data signal and the read data signal received from the input gating circuits, and outputting the results of the arithmetic operations as the modify data signal.

7. The memory controller according to claim 1, wherein the data modification unit comprises:
input gating circuits, in response to the fourth control signal, outputting or holding the arithmetic data signal and the read data signal;
first to N-th arithmetic units performing different arithmetic operations on the arithmetic data signal and the read data signal received from the input gating circuits, and outputting the results of the arithmetic operation as first to N-th arithmetic result signals, wherein N is integer; and
a multiplexer, in response to the fifth control signal, selecting one of the first to N-th arithmetic result signals and outputting the selected arithmetic result signal as the modify data signal.

8. The memory controller according to claim 1,
wherein the memory is an SDRAM, and
wherein, when the read address signal and the write address signal are identical to each other, in a state that a predetermined bank of the SDRAM is enabled, the memory controller reads the data signal from the SDRAM, modifies the read data signal, and writes the modified data signal to the SDRAM.

9. A system-on-chip (SOC) comprising:
a microprocessor connected to a system bus, the microprocessor controlling all devices connected to the system bus and executing a predetermined program;
an internal memory storing the predetermined program or main data obtained in operations of the microprocessor;
intellectual property (IP) blocks connected to the system bus, each of the IP blocks performing a predetermined function; and
a memory controller connected to an external memory and the system bus,
wherein, in response to one of read, write, and modify request signals received from the one of the IP blocks or the microprocessor and an address signal, the memory controller reads a data signal from the external memory, writes a write data signal to the external memory, or modifies the data signal read from the external memory and write the modified data signal to the external memory,
wherein the memory controller comprises:
a controller, in response to the read, write, and modify request signals, outputting first to ninth control signals, and outputting a read command signal or a write command signal together with a chip selection signal and a memory clock signal to the external memory;
an address generation unit, in response to the first control signal, storing the address signal received via the system bus, and generating a read address signal or a write address signal based on the stored address signal;
an address buffer, in response to the second control signal, storing the read address signal or the write address signal, and outputting the stored read address signal or write address signal to the external memory;
an input buffer, in response to the third control signal, storing a read data signal received from the external memory, and outputting the stored read data signal; and
a data modification unit being enabled or disabled in response to the fourth control signal, and
wherein, when the data modification unit is enabled, in response to the fifth control signal, the data modification unit performs an arithmetic operation on the read data signal and an arithmetic data signal, and outputs the result of the arithmetic operation as a modify data signal.

10. The SOC according to claim 9,
wherein, when the memory controller receives the write request signal, the memory controller further receive the write data signal via the system bus, and
wherein, when the memory controller receives the modify request signal, the memory further receives an arithmetic data signal via the system bus.

11. The SOC according to claim 9, wherein the memory controller comprises:
a selection unit, in response to the sixth control signal, selecting and outputting one of the modify data signal and the write data signal;
an output buffer, in response to the seventh control signal, storing the modify data signal or the write data signal, and outputting the stored modify data signal or write data signal to the external memory;
an input data processor, in response to the eighth control signal, storing the read data signal received from the input buffer, constructing the stored read data signal in a predetermined first format, and outputting the resultant data signal via the system bus; and
an output data processor, in response to the ninth control signal, storing the write data signal or the arithmetic data signal, constructing the stored write data signal or arithmetic data signal in a predetermined second format, and outputting the resultant data signal to the data modification unit and the selection unit.

12. The SOC according to claim 9, wherein, when the controller receives the modify request signal, the controller further receives an arithmetic information signal, and generates the fifth control signal in response to the arithmetic information signal.

13. The SOC according to claim 9, wherein, when the controller receives the modify request signal, the controller outputs the read command signal to the external memory, and, after a predetermined time interval, outputting the write command signal to the external memory.

14. The SOC according to claim 9, wherein the data modification unit comprises:
input gating circuits, in response to the fourth control signal, outputting or holding the arithmetic data signal and the read data signal; and an arithmetic unit performs arithmetic operations on the arithmetic data signal and the read data signal received from the input gating circuits, and outputting the results of the arithmetic operations as the modify data signal.

15. The SOC according to claim 9, wherein the data modification unit comprises:
input gating circuits, in response to the fourth control signal, outputting or holding the arithmetic data signal and the read data signal;
first to N-th arithmetic units performing different arithmetic operations on the arithmetic data signal and the read data signal received from the input gating circuits, and outputting the results of the arithmetic operation as first to N-th arithmetic result signals, wherein N is integer; and
a multiplexer, in response to the fifth control signal, selecting one of the first to N-th arithmetic result signals and outputting the selected arithmetic result signal as the modify data signal.

16. The SOC according to claim 9,
wherein the external memory is an SDRAM, and wherein, when the read address signal and the write address signal are identical to each other, in a state that a predetermined bank of the SDRAM is enabled, the memory controller reads the data signal from the SDRAM, modifies the read data signal, and writes the modified data signal to the SDRAM.

17. A memory controller comprising:

control means responsive to an address signal and read, write and modify request signals received from at least one IP block or microprocessor for outputting a plurality of control signals and outputting a read command signal or a write command signal together with a chip selection signal and a memory clock signal;

address generation means in signal communication with the control means for storing the address signal and generating a read address signal or a write address signal based on the stored address signal in response to a first of the plurality of control signals;

address buffer means in signal communication with the control means for storing the read address signal or the write address signal and outputting the stored read address signal or write address signal in response to a second of the plurality of control signals;

input buffer means in signal communication with the control means for storing a read data signal and outputting the stored read data signal in response to a third of the plurality of control signals; and data modification means in signal communication with the control means for performing an arithmetic operation on the read data signal and an arithmetic data signal and outputting the result of the arithmetic operation as a modify data signal in response to a fourth of the plurality of control signals.

18. A system-on-chip (SOC) comprising a memory controller as defined in claim 17, the SOC further comprising:

a microprocessor in signal communication with the bus means for controlling devices connected to the bus means and executing a predetermined program;

an internal memory in signal communication with the bus means for storing at least one of the predetermined program and data obtained in operations of the microprocessor; and an intellectual property (IP) block in signal communication with the bus means for performing a predetermined function.

* * * * *